United States Patent [19]

Hodges

[11] Patent Number: 4,549,240
[45] Date of Patent: Oct. 22, 1985

[54] WRITE PROTECTION DEVICE
[75] Inventor: Brian A. Hodges, Foster City, Calif.
[73] Assignee: Verbatim Corporation, Sunnyvale, Calif.
[21] Appl. No.: 444,793
[22] Filed: Nov. 26, 1982
[51] Int. Cl.[4] ...................... G11B 23/04; G11B 15/04
[52] U.S. Cl. ........................................ 360/133; 360/60
[58] Field of Search ................... 360/60, 133, 135, 97, 360/74.6

[56] References Cited

U.S. PATENT DOCUMENTS

| 4,320,422 | 3/1982 | Rinkleib | 360/60 |
| 4,348,707 | 9/1982 | Maly et al. | 360/132 |
| 4,460,930 | 7/1984 | Takahashi | 360/60 |

Primary Examiner—Stuart N. Hecker
Assistant Examiner—B. Urcia
Attorney, Agent, or Firm—Thomas E. Schatzel

[57] ABSTRACT

A magnetic recording disk cartridge has a write control sensing aperture extending through the cartridge. A shutter is mounted within the cartridge for back and forth rotational movement between aperture blocking and aperture opening positions. The shutter is restrained against accidental movement or drift from these positions. The shutter can be assembled locked in a write protect position and must be reassembled to permit movement between the write protect and write enable positions.

10 Claims, 10 Drawing Figures

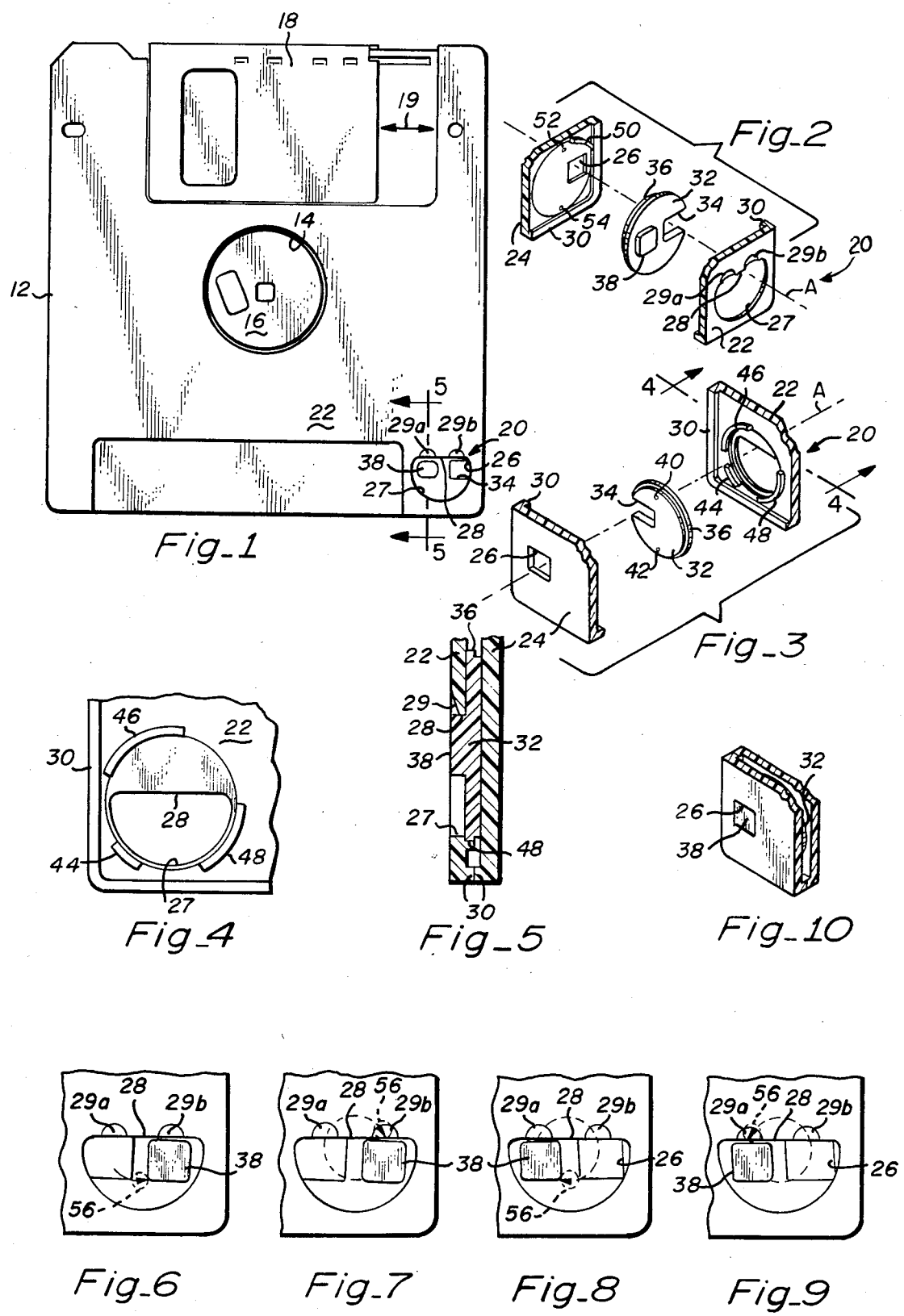

WRITE PROTECTION DEVICE

BACKGROUND OF THE INVENTION

1. Field of the Invention

This invention relates generally to a magnetic recording disk cartridge, and more specifically to a write protection device for such a cartridge.

2. Description of the Prior Art

Write protection devices have been used to prevent the loss of data on a magnetic recording disk by accidentally recording over the data. One such device is a breakaway flap covering an aperture in a magnetic disk cartridge manufactured by Sony Corporation. This flap prevents a spring loaded plunger switch from extending through the aperture and activating a circuit for recording. By breaking the flap away from the aperture, the write protection is lost and new data can be recorded on the disk. Such a device does not permit a user to choose a write protect mode of operation after the write enabling mode has been utilized.

An optical light sensor can be used to control a write enabling circuit. Light from a source on one side of a magnetic disk cartridge can pass through an aperature in the cartridge to activate the optical light sensor. Thus, the write enabling circuit can be controlled by blocking or opening the aperture.

SUMMARY OF THE PRESENT INVENTION

An object of the present invention is to provide a magnetic recording disk cartridge with a write protection device that a user's discretion can protect against or enable recording on the disk.

Another object of the invention is to provide a write protection device that is not lost or destroyed by recording on the disk.

A further object of the invention is to provide a write protection device that does not move accidently between write protect and write enable positions.

An additional object of the invention is to provide a write protection device that can be assembled locked in a write protect position and must be reassembled to permit movement between write protect and write enable positions.

In accordance with the present invention, there is provided a write protection device. A magnetic recording disk cartridge has a write control sensing aperture extending through the cartridge. A shutter is mounted within the cartridge for movement back and forth between aperture blocking and aperture opening positions. In a preferred embodiment of the invention, the shutter is restrained against accidental movement. The shutter can be assembled locked in a write protect position and must be reassembled to permit movement between write protect and write enable positions.

Among the advantages of the present invention are a write protection device that can be controlled at a user's discretion to protect against or to enable recording on a disk, such a device that is not lost or destroyed by recording the disk, such a device that does not move accidentally between write protect and write enable positions, and such a device that can be assembled locked in a write protect position and must be reassembled to permit movement between write protect and write enable positions.

These and other objects and advantages of the present invention will no doubt become obvious to those of ordinary skill in the art after having read the following detailed description of the preferred embodiments which are illustrated in the various drawing figures.

IN THE DRAWING

FIG. 1 is a bottom plan view of a magnetic recording disk cartridge embodying the present invention.

FIG. 2 is an exploded perspective view of the write protection device, as viewed from the side shown in FIG. 1, and with the remainder of the magnetic recording disk cartridge being broken away.

FIG. 3 is an exploded perspective view of the write protection device taken from the opposite side of the cartridge.

FIG. 4 is an enlarged view in elevation taken on the line 4—4 of FIG. 3.

FIG. 5 is an enlarged section in elevation taken on the line 5—5 of FIG. 1.

FIGS. 6–10 are schemmatic views illustrating the operation of the write protection device.

DETAILED DESCRIPTION OF THE PREFERRED EMBODIMENT

With reference to FIG. 1, a magnetic recording disk cartridge 12 has a central opening 14 through which a metallic hub 16 can be seen. A flexible magnetic recording disk is mounted to the hub for rotation within the cartridge. A movable shutter 18 is provided to slide back and forth, as indicated by arrow 19, to provide access to the magnetic recording disk for sensing or recording data thereon. A write protection device, indicated by general reference numeral 20, is located near a corner of the cartridge where it does not interfere with the recording disk.

The cartridge 12 is formed by a pair of sides 22 and 24, shown in FIGS. 2 and 3. A write control sensing aperture 26, having an axis A, extends through the cartridge. This aperture is formed by a generally square opening in the side 24 and extends through a circular segmental opening 27 in the side 22. This side has a chordal edge 28 and a pair of beveled surfaces 29a and 29b. The sides are spaced apart by inwardly projecting flanges 30 at the periphery of the cartridge, and a shutter 32 is mounted within the cartridge.

The shutter 32 has a generally disc-like shape with a peripheral indentation 34 to clear the write control sensing aperture 26. The peripheral rim of the shutter is stepped radially at an intermediate axial location 36. A projection 38 extends from one side of the shutter for a distance equal to the thickness of the cartridge side 22. This projection has a cross-sectional shape adapted to fit snugly within the write control sensing aperture. A pair of indentations 40 and 42 are provided on the shutter side opposite from the projection.

The shutter 32 is mounted for rotational movement and journalled between arcuate ribs 44, 46 and 48 that project inwardly from cartridge side 22, as shown in FIGS. 3 and 4. An arcuate rib 50 (FIG. 2), that projects inwardly from cartridge side 24, contacts the rib 46 to provide lateral support for the cartridge sides. A pair of fine projections 52 and 54 on side 24 fit within the indentations 40 and 42 on the shutter to provide frictional resistance. Thus, accidental rotation of the shutter from either an aperture blocking position or an aperture open position is prevented, but such frictional resistance is readily overcome when the shutter is driven.

The shutter 32 operated from outside the cartridge 12 by a spring loaded plunger pin 56, shown in phantom line in FIGS. 6–9. This pin is not a part of the disclosed device, but is part of the disk drive. As shown in FIG. 6, the shutter is in a position with the projection 38 blocking the write control sensing aperture 26 and contacting the chordal edge 28 near the bevel surface 29b. The pin applies a force to the projection as indicated by the arrow. To open the shutter, the pin revolves through an arc as indicated by the arrow in FIG. 7. Since the pin is a spring loaded plunger, it can move inward at the bevel surface 29b to contact the edge of the projection 38. The shutter is then driven through an arc as indicated by the arrow to the open aperture position, shown in FIG. 8, with the projection contacting the chordal edge near the bevel surface 29a. To close the aperture 26, the pin revolves through an arc, as indicated by the arrow in FIG. 9, to contact the projection 38 near the bevel surface 29a. The projection is then driven to the position shown in FIG. 6, and the operation can be repeated.

If it is desired to prevent the cartridge from being changed to a write enabling condition by operation of the pin 56, the shutter 32 can be assembled in a side reversed manner with the projection 38 fitting through the aperture 26, as shown in FIG. 10. In this position, the shutter is locked against any rotational movement and must be reassembled to enable control by the pin.

From the foregoing description, it will be seen that the write protection device 20 can be controlled at a user's discretion to protect against or to enable recording on disk. The write protection is not lost or destroyed by recording on the disk. The write protection does not move accidentally between write protect and write enable positions. The write protection can be assembled locked in a write protect position and must be reassembled to permit movement between write protect and write enable positions.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A write protection device comprising
a magnetic recording disk cartridge formed by a pair of opposed sides having a write control sensing aperture extending through both sides of the cartridge and including a circular segmental opening in one side of the cartridge,
a shutter mounted within the cartridge for arcuate movement back and forth between positions wherein the aperture is either open or blocked by the shutter, and
a projection that extends eccentrically from the shutter for cranking the shutter from one position to the other, said projection extending into the circular segmental opening and having surfaces that contact the cartridge for stopping movement of the shutter in the desired positions.

2. The write protection device of claim 1 wherein said cartridge adjacent the circular segmental opening has a chordal edge that contacts the projection at two locations for stopping movement of the shutter.

3. The write protection device of claim 2 wherein said cartridge side adjacent the chordal edge at the two locations is beveled to enable engagement of the projection within a plane of the cartridge side.

4. The write protection device of claim 2 including fine projections and indentations on adjacent sides of the shutter and the cartridge that interfit for retaining the shutter against accidental movement from the two positions wherein the aperture is either open or blocked by the shutter.

5. A write protection device comprising
a magnetic recording disk cartridge formed by a pair of opposed sides having
a write control sensing aperture extending through both sides of the cartridge, and
a circular segmental opening in one side of the cartridge and an opening opposite the circular segmental opening, mountable within the cartridge between the sides, and
a projection that extends eccentrically from the shutter,
said shutter and said projection being mountable in a manner for arcuate movement back and forth between positions wherein the aperture is either open or blocked by the shutter and in a reverse manner for locking the shutter in place and blocking the aperture, such projection engaging an edge of the opening opposite the circular segmental opening.

6. The write protection device of claim 5 wherein said projection fits tightly within the opening opposite the circular segmental opening, locking the shutter in place and blocking the aperture.

7. The write protection device of claim 6 wherein said write control sensing aperture and said projection have generally square cross-sectional shapes.

8. The write protection device of claim 5 wherein said projection extends into the circular segmental opening for cranking the shutter in arcuate movement back and forth between positions wherein the aperture is either open or blocked by the shutter.

9. The write protection device of claim 8 wherein said cartridge adjacent the circular segmental opening has a chordal edge, and said projection has surfaces that contact the chordal edge of the cartridge for stopping movement of the shutter in either the open or blocked aperture positions.

10. The write protection device of claim 8 including fine projections and indentations on adjacent sides of the shutter and the cartridge that interfit for retaining the shutter against movement from the two positions wherein the aperture is either open or blocked by the shutter.

* * * * *